United States Patent [19]

Kawabata et al.

[11] Patent Number: 4,612,152
[45] Date of Patent: Sep. 16, 1986

[54] METHOD FOR PRODUCTION OF WATER-PROOFING SHEET

[75] Inventors: Kazuhisa Kawabata, Chiba; Hirohide Kumabe, Kanagawa; Shunzo Kawai, Chiba, all of Japan

[73] Assignee: Daiawa Kobunshi Kogyo Co., Ltd., Tokyo, Japan

[21] Appl. No.: 666,256

[22] Filed: Oct. 29, 1984

[51] Int. Cl.[4] .............................................. B29C 47/06
[52] U.S. Cl. .................................... 264/136; 523/169; 523/172; 264/167; 264/171; 264/210.2; 264/210.6; 264/284
[58] Field of Search ............... 264/167, 284, 175, 136, 264/171, 210.2, 210.6; 523/169, 172; 106/DIG. 7

[56] References Cited

U.S. PATENT DOCUMENTS

| | | | |
|---|---|---|---|
| 1,821,552 | 9/1931 | Kirschbraun | 264/171 |
| 2,033,488 | 3/1936 | Sherman | 264/136 |
| 2,123,180 | 7/1938 | Corbin, Jr. et al. | 264/171 |
| 2,295,891 | 9/1942 | Copeman | 264/136 |
| 3,196,062 | 7/1965 | Kristal | 264/284 |
| 3,486,920 | 12/1969 | Sington et al. | 264/284 |
| 4,148,780 | 4/1979 | Blümel et al. | 264/175 |
| 4,329,309 | 5/1982 | Kelly | 264/175 |

FOREIGN PATENT DOCUMENTS

| | | | |
|---|---|---|---|
| 2454975 | 5/1975 | Fed. Rep. of Germany | 264/284 |
| 54-9415 | 4/1979 | Japan | |

Primary Examiner—Jeffery Thurlow
Attorney, Agent, or Firm—Albert L. Jeffers; Stephen T. Belsheim

[57] ABSTRACT

A method for the production of a water-proofing sheet by mixing a thermoplastic rubber with asphalt, and then shaping the mixture directly into sheet having exhaust grooves on its surface.

The vapor coming from water contained in foundation which is covered with the water-proofing sheet is exhausted through the grooves.

1 Claim, 5 Drawing Figures

METHOD FOR PRODUCTION OF WATER-PROOFING SHEET

BACKGROUND OF THE INVENTION

This invention relates to a method of producing a water-proofing sheet.

Up to the present, many kinds of water-proofing sheets made of various materials have been used to protect buildings from water. The sheet is adhered on the surface of a foundation such as a concrete roof and so on with an adhesive to constitute a water-proofing layer.

Generally the work is carried out on a foundation dried thoroughly, but sometimes it can not help being carried out on a humid foundation due to the time of work, its relationship with other tasks or the weather.

In such a case, voids appear between the sheet and the foundation by pressure of vapor coming from water contained in the foundation or by expansion of air. Such voids spoil the appearance of the sheet, weaken the strength of adhesion and cause chemical deterioration or fatigue fraction.

In connection with this, there are provided a water-proofing sheet comprising a rubber sheet adhered on a foam rubber sheet which has exhausted grooves on the other side (Japanese Pat. No. 9415/1979). The grooved side of the water-proofing rubber sheet is attached on the surface of a foundation. Then, the vapor and the air coming from the foundation are exhausted out side through the grooves and ventilation holes which are connected thereto.

However, it is complicated and expensive to produce the double layer rubber sheet. Moreover it is difficult to stick the sheets tightly to each other at a joint section to prevent leaking of water.

On the other hand, it was difficult to obtain practical products of the grooved sheet if asphalt is used to make a sheet. Because, conventional rubber asphalts consist of common rubbers and asphalt, they have experienced difficulty in being vulcanized at the high temperature of asphalt processing. When the sheet is put under pressure, the shortage of vulcanization causes its shape to deform and choke the exhaust grooves, and consequently, the exhaustion of the vapor and the air is prevented substantially.

SUMMARY OF THE INVENTION

An object of this invention is to provide a method of producing a water-proofing asphalt sheet which does not lose its shape or deform under pressure to choke the exhaust grooves shaped on its surface with a simplified process.

According to this invention, at least 5 weight parts of thermoplastic rubber is mixed with 100 weight parts of asphalt.

Then the rubber asphalt mixture is shaped into sheets having grooves connected with each other.

DETAILED DESCRIPTION OF THE INVENTION

The asphalt which may be used in the present invention may be, for example, straight asphalt, natural asphalt, blown asphalt, etc., having been normally used for water-proofing sheets.

The rubbers which constitute the rubber asphalt according to the present invention are thermoplastic rubbers.

As the thermoplastic rubber, for example, a SBS or SBSB block copolymer of butadiene-stylene prepared with a lithium catalyst (for example, Cariflex (trade name) made by SHELL Corp. and Tafbulen (trade name) made by ASAHIKASEI KOGYO Corp.) is illustrated.

According to the present invention the rubber such as mentioned above is blended in the amount of at least 5 weight parts with 100 weight parts of the asphalt.

The effects of adding rubber can not be obtained at the weight parts under 5.

The weight parts of the thermoplastic rubber against the asphalt is preferably 10–40, more preferably 17–25 weight parts for the workability, molding characteristic and retention and recovery of the shape of the grooves.

The rubber asphalt mixture may include other agents, for example, paraffin wax, petroleum resin, oil, etc.

The above rubber asphalt mixture which is in a molten state is shaped directly into a sheet having grooves on its surface.

The molding temperature of the rubber asphalt, including the thermoplastic rubber is, for example, about 170° C.

Figure 1:
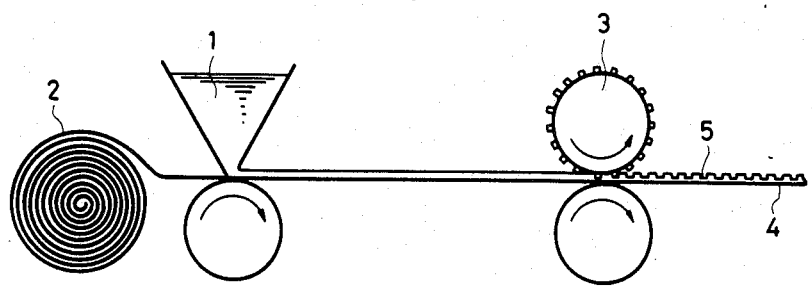
FIG. 1 is a flow diagram of the present invention.
Figure 2:
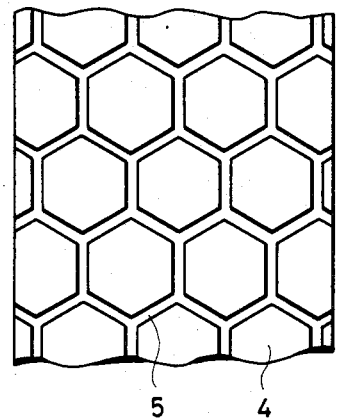
FIGS. 2(*a*), 2(*b*), 2(*c*) are plan views of the water-proofing sheets of the present invention.
Figure 2:
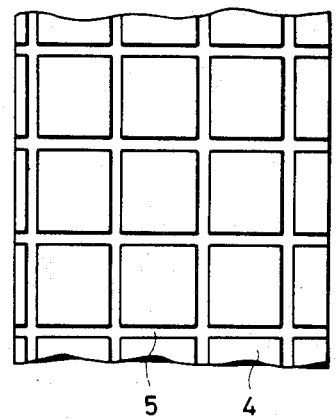
Figure 2:
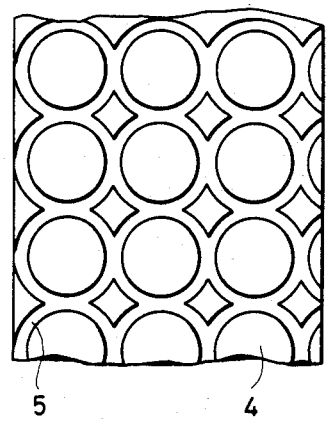
Figure 3:
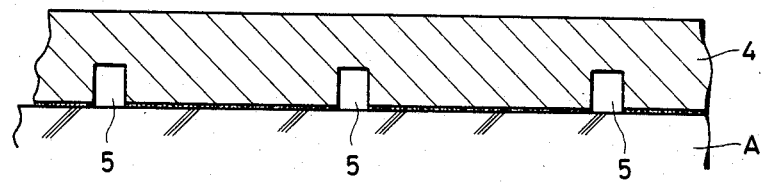
FIG. 3 is a longitudinal sectional view of the water-proofing sheet of the present invention.

Conventional methods of sheet shaping may be employed for the present invention. For example, the rubberized asphalt 1 in molten state is flowed on a plate and shaped into a sheet, or is flowed on a cloth 2 and made into an impregnated sheet as illustrated FIG. 1. Then, before hardening the sheet of rubberized asphalt is pressed, for example, at 120° C. by an embossed roller 3, and is shaped into sheet 4 having grooves 5 on its surface as illustrated in FIGS. 1–3, and then it is cooled.

The sheet 4 has a thickness of preferably 2–6 mm. The groove 5 is, for example, 1–3 mm in width, and is, for example, 0.5–1.5 mm in depth.

According to the present invention, there is no necessity to vulcanize the rubberized asphalt so that the production process can be simplified.

Because of including the thermoplastic rubber as the rubber consistent, the water-proofing sheet of the present invention has the same properties as the conventional vulcanized rubberized composition, and does not lose its shape under pressure to choke the exhaust grooves. Therefore, there is no adverse effect on its strength.

According to the present invention, the waterproofing sheet 4, when adhered to foundation A, as illustrated FIG. 3 obeys an expansion or contraction of the foundation A and relieves the stress to prevent fatigue or deterioration.

According to the present invention, the sheets can easily be adhered to each other at a joint section to prevent leaking of water.

Thus, the present invention can provide a useful water-proofing sheet easily with low cost.

The invention will be more clearly illustrated with reference to the following examples:

EXAMPLE

According to the proportion shown in the table 1, asphalts, rubbers and some agents are fed into a vessel attached with agitator. Then they are mixed, and are melted into rubberized asphalt under stirring at 190°–220° C. The rubberized asphalt thusly obtained is fed into a coater pan. And a sheet of nonwoven fabric is coated continuously with the rubberized asphalt in the thickness of 1.5 mm and width of 1 m. Then the sheet is pressed by an embossed roller into a sheet having grooves of hexagonal meshy pattern on its surface.

The groove is 1.5 mm in width and is 0.7 mm in depth. The side of the hexagon surrounded by the grooves is 5 mm in length.

TABLE 1

| Test No. | 1 | 2 | 3 | 4 | 5 | 6 | 7 | 8 | 9 |
|---|---|---|---|---|---|---|---|---|---|
| Straight asphalt | 100 | 100 | 100 | 30 | | | 100 | 100 | 100 |
| Blown asphalt | | | | 70 | 100 | 100 | | | |
| SBS | 4 | 10 | 17 | 20 | 20 | 23 | 25 | 30 | 35 |
| Paraffin wax | | 2 | 4 | 5 | 5 | 5 | 5 | | |
| Petroleum resin (m.p 120) | | 10 | 8 | 10 | 10 | 10 | 10 | 25 | 35 |
| Oil | | | | | | | | 10 | 10 |
| viscosity (170° C.) | 1,000 | 2,000 | 7,000 | 6,500 | 7,500 | 11,000 | 8,000 | 17,000 | 15,000 |
| Penetration (60° C.) | | | | 44 | 42 | 38 | 48 | | |
| tensile strength (kg/cm$^2$) | 0.64 | 3.5 | 16 | 21 | 18 | 23 | 30 | 20 | 23 |

The rubberized asphalt sheets obtained above are adhered on a surface of just constructed roof of a building by aqueous adhesive (acryl or EVA type) on the grooved surface. For improving the appearance, the surface of the non-woven fabric is coated with liquid urethane rubber (gray coloured). A ventilator is set on the sheets per 100 m$^2$ of them.

The sheets are exposed to the scorching sunshine for six months including summer season. It was 37°–40° C. at peak in the day time during the midsummer. And the temperature on the surface of the sheets reached 60°–65° C. Some concrete blocks of 10 kg are placed on the sheets.

Any boil or bubble originated from the pressure of the vapor or the air does not appeared, and anything unusual on the appearance of the sheets is not recognized.

The grooves of the sheets, No. 2–9, are not choked by the weight of the blocks. Especially the sheets, No. 3–9, possessed excellent retention and recovery of the shape of the grooves. And the rubberized asphalts of No. 3–7, are excellent in molding characteristic.

But, in the grooves of the sheet, No. 1, have lost shape are choked, and the property of the rubberized asphalt of No. 1 falls at low temperature.

The grooves of the sheet, No. 2, have lost shape to some extent in the summer.

The rubberized asphalts of No. 8, 9 are not good in workability, but have good property for grooved water-proofing sheet.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method for production of water-proofing sheets, which comprises mixing 17–25 weight parts of thermoplastic rubber of SBS or SBSB block copolymer of butadiene-styrene with 100 weight parts of asphalt, and shaping the rubberized asphalt thus obtained into sheet having grooves connected with each other on its surface.

* * * * *